United States Patent
Haynie et al.

(10) Patent No.: US 12,278,474 B2
(45) Date of Patent: Apr. 15, 2025

(54) DUAL CORE SHOOT-THROUGH PROTECTION INDUCTOR TOPOLOGY

(71) Applicant: AEROJET ROCKETDYNE, INC., Sacramento, CA (US)

(72) Inventors: Carl Roger Haynie, Pilot Hill, CA (US); Aaron Michael Poehls, Simi Valley, CA (US)

(73) Assignee: AEROJET ROCKETDYNE, INC., Sacramento, CA (US)

( * ) Notice: Subject to any disclaimer, the term of this patent is extended or adjusted under 35 U.S.C. 154(b) by 144 days.

(21) Appl. No.: 18/255,179

(22) PCT Filed: Dec. 9, 2020

(86) PCT No.: PCT/US2020/063919
§ 371 (c)(1),
(2) Date: May 31, 2023

(87) PCT Pub. No.: WO2022/125086
PCT Pub. Date: Jun. 16, 2022

(65) Prior Publication Data
US 2024/0022061 A1    Jan. 18, 2024

(51) Int. Cl.
*H02H 3/00* (2006.01)
*H02H 3/08* (2006.01)

(52) U.S. Cl.
CPC ..................... *H02H 3/08* (2013.01)

(58) Field of Classification Search
CPC .......... H02H 3/08; H02J 3/1857; H02M 3/01; H02M 3/335; H02M 1/38
(Continued)

(56) References Cited

U.S. PATENT DOCUMENTS 4,937,725 A * 6/1990 Dhyanchand ........... H02M 1/34
363/56.05
4,969,081 A * 11/1990 Shekhawat ............. H02M 1/38
363/132
(Continued)

FOREIGN PATENT DOCUMENTS

EP          0568279       11/1993
WO        2009132427     11/2009

OTHER PUBLICATIONS

International Preliminary Report on Patentability for International Application No. PCT/US2020/063919 mailed Jun. 22, 2023.
(Continued)

*Primary Examiner* — Jared Fureman
*Assistant Examiner* — Lucy M Thomas
(74) *Attorney, Agent, or Firm* — Fox Rothschild LLP; Carol E. Thorstad-Forsyth

(57) ABSTRACT

A shoot-through protection circuit including a first switch connected to a positive bus and connected to a first center node via a first electrical path, a second switch connected to a negative bus and connected to the first center node via a second electrical path, a circuitous third electrical path connecting the first center node to a first load output, a first magnetic core surrounding the first electrical path and the circuitous third electrical path, a second magnetic core surrounding the second electrical path and the circuitous third electrical path, and wherein a polarity of one of the first electrical path and the second electrical path is aligned with a polarity of the circuitous third electrical path within the corresponding one of the first magnetic core and the second magnetic core and a polarity of the other of the first electrical path and the second electrical path opposes the polarity of the circuitous third electrical path within the corresponding one of the first magnetic core and the second magnetic core.

12 Claims, 3 Drawing Sheets

(58) Field of Classification Search
USPC .......................................................... 361/101
See application file for complete search history.

(56) References Cited

U.S. PATENT DOCUMENTS

| | | | | |
|---|---|---|---|---|
| 5,204,809 | A * | 4/1993 | Andresen .............. | H02M 3/158 |
| | | | | 363/17 |
| 8,270,191 | B2 * | 9/2012 | Zhu ..................... | H02M 7/5387 |
| | | | | 363/132 |
| 2005/0073780 | A1 * | 4/2005 | Elms ................... | H02H 1/0015 |
| | | | | 361/42 |

OTHER PUBLICATIONS

International Search Report and Written Opinion for International Application No. PCT/US2020/063919 mailed Aug. 13, 2021.

* cited by examiner

DUAL CORE SHOOT-THROUGH PROTECTION INDUCTOR TOPOLOGY

TECHNICAL FIELD

The present disclosure relates generally to a shoot-through current fault protection circuit for circuits exposed to shoot-through current spikes.

BACKGROUND

Electrical circuits, such as those used in satellites and spacecraft, include many different power requirements. Converting from DC to AC, converting from DC to DC, as well as many other standard power system implementations, involves bridge circuits such as an H-bridge circuit which utilizes multiple serially arranged transistors alternately switched to provide proper power conversion. Exposure to certain conditions that are more prevalent in space applications can result in an undesired closing of one or more switches within the circuitry. When the closed switches result in a series connection of a positive terminal to a negative terminal, a short circuit occurs and a rapid increase in current will result. This condition is referred to as a shoot-through event.

In some cases, the rapid current increase can cause current through the switches, or other electronics, to exceed rated current levels and the electronics can be damaged or destroyed. Further, due to the speed at which the current rises in a shoot-through event, existing protection systems that are reactionary (i.e. only activate after an event is detected) can be too slow to provide adequate protection during some events.

SUMMARY OF THE INVENTION

In one exemplary embodiment a shoot-through protection circuit includes a first switch connected to a positive bus and connected to a first center node via a first electrical path, a second switch connected to a negative bus and connected to the first center node via a second electrical path, a circuitous third electrical path connecting the first center node to a first load output, a first magnetic core surrounding the first electrical path and the circuitous third electrical path, a second magnetic core surrounding the second electrical path and the circuitous third electrical path, and wherein a polarity of one of the first electrical path and the second electrical path is aligned with a polarity of the circuitous third electrical path within the corresponding one of the first magnetic core and the second magnetic core and a polarity of the other of the first electrical path and the second electrical path opposes the polarity of the circuitous third electrical path within the corresponding one of the first magnetic core and the second magnetic core.

Another example of the above described shoot-through protection circuit further includes a third switch connected to the positive bus and to a second center node via a fourth electrical path, a fourth switch connected to the negative bus and to the second center node via a fifth electrical path, a circuitous sixth electrical path connecting the second center node to a second load output, the first magnetic core surrounding the fourth electrical path and the circuitous sixth electrical path, the second magnetic core surrounding the fifth electrical path and the circuitous sixth electrical path, and wherein a polarity of one of the fourth electrical path and the fifth electrical path is aligned with a polarity of the circuitous sixth electrical path within the corresponding one of the first magnetic core and the second magnetic core and a polarity of the other of the fourth electrical path and the fifth electrical path opposes the polarity of the circuitous sixth electrical path within the corresponding one of the first magnetic core and the second magnetic core.

In another example of any of the above described shoot-through protection circuits the polarity of the first electrical path is aligned with the polarity of the circuitous third electrical path in the first magnetic core and the polarity of the fourth electrical path opposes the polarity of the circuitous sixth electrical path in the first magnetic core.

In another example of any of the above described shoot-through protection circuits the polarity of the second electrical path opposes the polarity of the circuitous third electrical path in the second magnetic core and wherein the polarity of the fifth electrical path is aligned with the polarity of the circuitous sixth electrical path in the second magnetic core.

In another example of any of the above described shoot-through protection circuits the first, second, third and fourth switches are connected as an H-bridge topology.

In another example of any of the above described shoot-through protection circuits the circuit is characterized by a lack of Zero Volt Switching (ZVS) inductors.

In another example of any of the above described shoot-through protection circuits at least one of the first and second switch includes a voltage spike snubber.

In another example of any of the above described shoot-through protection circuits at least one of the first and second switch lacks a voltage spike snubber.

In another example of any of the above described shoot-through protection circuits each of the first switch and the second switch are field effect transistors (FETs).

In another example of any of the above described shoot-through protection circuits the first switch and the second switch are arranged as a half bridge topology.

An exemplary method for mitigating shoot-through events includes connecting a first switch to a center node via a first electrical path, connecting a second switch to the center node via a second electrical path, connecting the center node to a load via a circuitous third electrical path, passing the first electrical path and the circuitous third electrical path through a first magnetic core, passing the second electrical path and the circuitous third electrical path through a second magnetic core, and wherein the first electrical path is aligned with the circuitous third electrical path within the first magnetic core and the polarity of the second electrical path opposes the circuitous third electrical path within the second magnetic core.

Another example of the above described method for mitigating shoot-through events further includes connecting a third switch to a second center node via a fourth electrical path connecting a fourth switch to the second center node via a fifth electrical path, connecting the second center node to the load via circuitous sixth electrical path, passing the fourth electrical path and the circuitous sixth electrical path through the first magnetic core, passing the fifth electrical path and the circuitous sixth electrical path through the second magnetic core, and wherein the polarity of the fourth electrical path opposes the polarity of the circuitous sixth electrical path within the first magnetic core, and wherein the polarity of the fifth electrical path is aligned with the circuitous sixth electrical path within the second magnetic core.

In another example of any of the above described methods for mitigating shoot-through events the first switch and the second switch are field effect transistors.

Another example of any of the above described methods for mitigating shoot-through events further includes snubbing zero voltage switching voltage using a body diode of each of the first switch and the second switch.

These and other features of the present invention can be best understood from the following specification and drawings, the following of which is a brief description.

DETAILED DESCRIPTION

Figure 1:
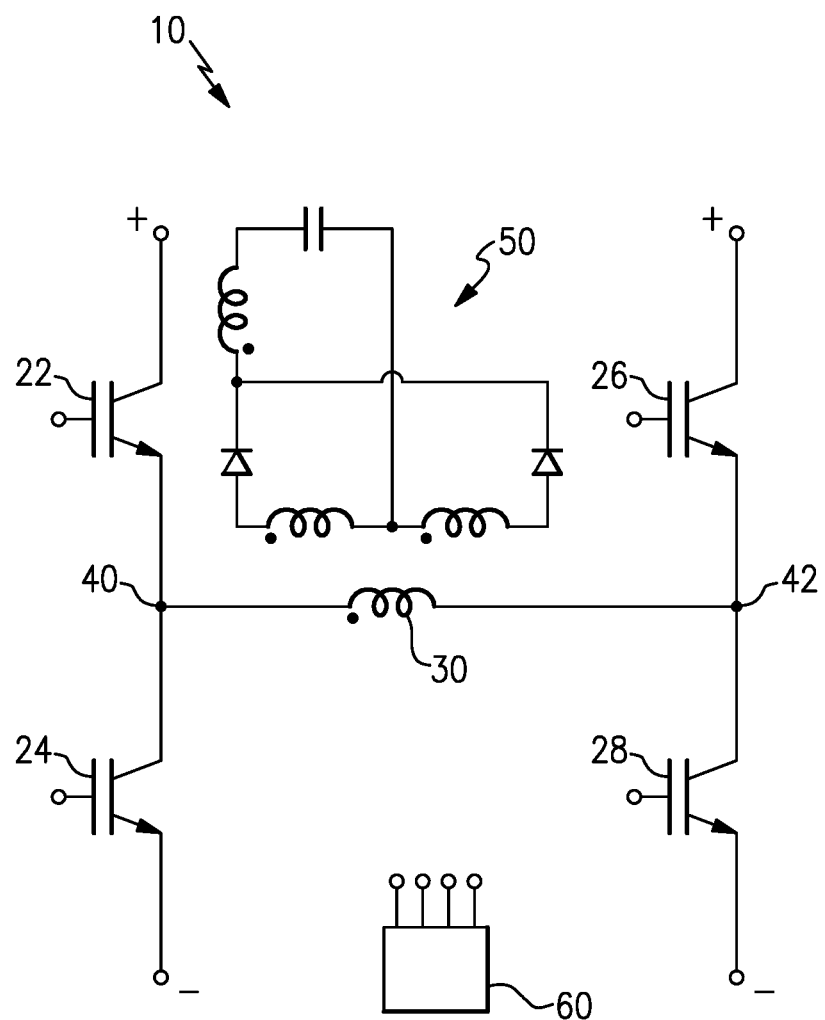
FIG. 1 illustrates an exemplary prior art H-bridge switching circuit topology.

FIG. 1 schematically illustrates an exemplary H-bridge topology 10 according to existing electrical circuit designs. The H-bridge 10 includes four transistors 22, 24, 26, 28 with a first set of two transistors 22, 24 arranged in series, a second set of two transistors 26, 28 arranged in series. An inductor 30 is connected across the nodes 40, 42 connected each set of transistors 22, 24, 26, 28. The inductor 30 creates an electromagnetic connection to a transformer 50, and a controller 60 controls operations of the transistors 22, 24, 26, 28 thereby preventing the two transistors in any set from being closed simultaneously. Positive and negative terminals of each set of transistors 22, 24, 26, 28 are connected to positive and negative terminals of a corresponding DC bus. The controller 60 operates according to known H-bridge control principles to provide power to a power distribution system. The inductor 30 also operates as a zero voltage switching (ZVS) inductor and mitigates shoot-through events.

During normal operations, the transistors 22, 24, 26, 28 are switched alternately by the controller 60 to provide the correct power output across nodes 40 and 42. Due to the semiconductor construction of the transistors, exposure to radiation or electromagnetic pulses can override the control signal input and force the transistors 22, 24, 26, 28 to a closed (alternately referred to as a shoot-through) state. When both transistors, either 22, 24 or 26, 28 in a given set of transistors, or both sets, are operating in a closed state simultaneously, a short circuit occurs directly connecting the positive and negative terminals. The short circuit results in a fast current ramp (di/dt) to a high current level that can burn out connected electrical circuitry, or the transistors 22, 24, 26, 28 themselves, causing an unrecoverable failed state.

Most terrestrial applications are not expected to be exposed to hazards of the type that could cause the above described failure state. However, space applications such as satellites, space stations, and similar systems are exposed to radiation spikes that can cause the above described failure state through the duration of the radiation spike. Similarly, terrestrial applications expected to be exposed to substantial amounts of radiation or electromagnetic pulses can experience the same or similar failure states. In both cases, when the transistors in the H-bridge are exposed to an event the transistors can be forced closed (shoot-through) until the event has completely passed.

Figure 2:
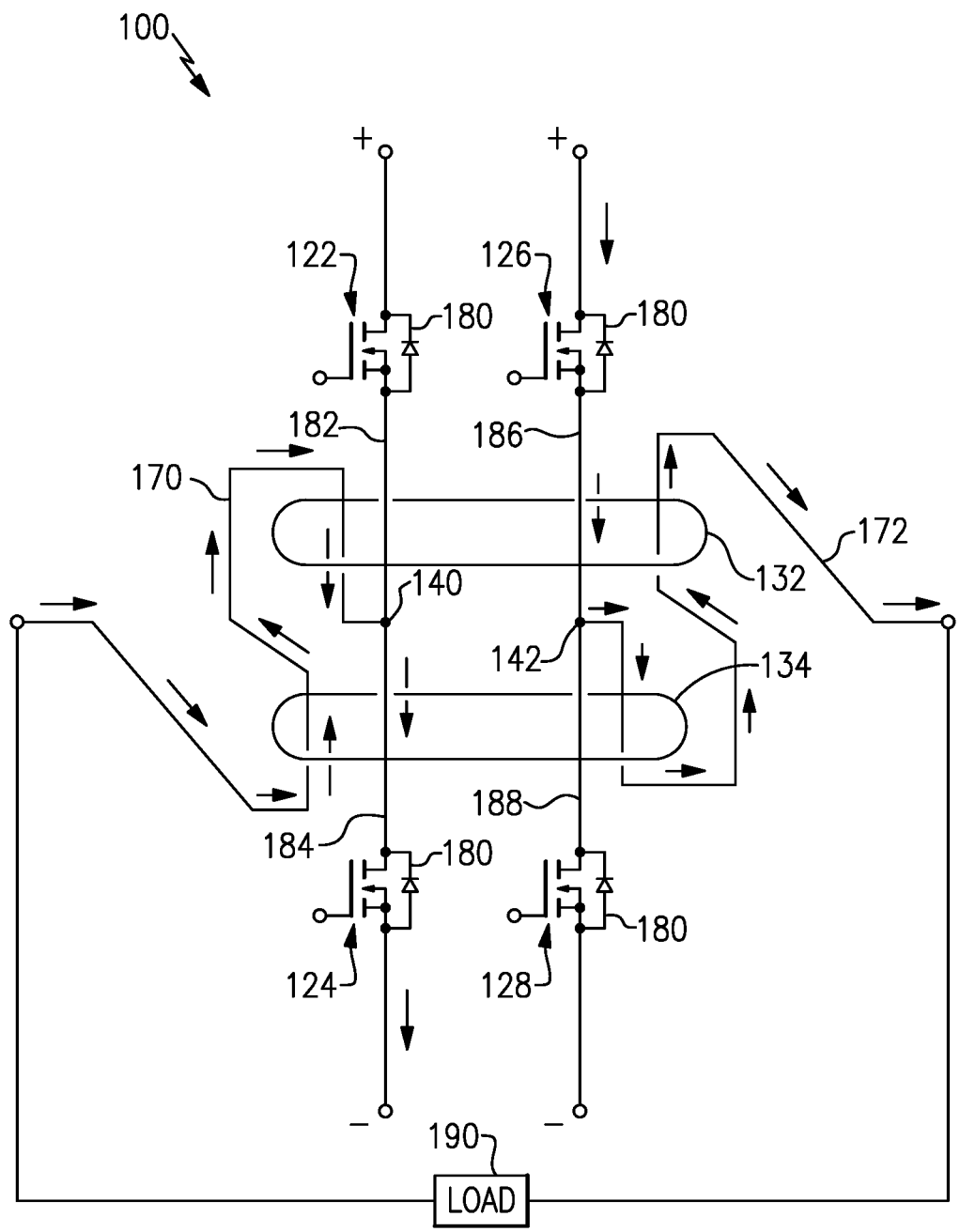
FIG. 2 schematically illustrates an exemplary dual core shoot-through protection inductor H-bridge rectifier topology.

With continued reference to the generic H-bridge configuration of FIG. 1, and with like numerals indicating like elements, FIG. 2 schematically illustrates an H-bridge configuration 100 including a dual core shoot-through protection inductor arrangement configured to protect against the failure states described above. As with the conventional H-bridge 10, the H-bridge 100 of FIG. 2 includes two sets of transistors 122, 124, 126, 128 with each set being arranged in series and connected to a corresponding center node pair 140, 142 via an electrical path 182, 184, 186, 188. Each of the transistor 122, 124, and 126, 128 sets connects a positive terminal to a negative terminal. The zero voltage switching inductor 30 connecting the nodes 140, 142 in the prior art is omitted (the omission is illustrated in dashed form in FIG. 2) and is replaced with a pair of magnetic cores 132, 134 arranged in a dual shoot-through protection configuration. The illustrated directional arrows indicate an exemplary instantaneous current flow during normal operations.

Each of the nodes 140, 142 is connected to a terminal of a load 190 via a corresponding circuitous electrical path 170, 172. As used herein, an electrical path refers to any combination electrical wires, circuit traces, or other current path connecting electrical components with a minimal or negligible impedance. Each circuitous electrical path 170, 172 is intertwined with the dual magnetic cores 132, 134 such that the electrical path 170, 172 is aligned with the polarity of the corresponding transistors 122, 124, 126, 128 as the electrical path 170, 172 passes through one of the cores 132, 134 and opposed to the polarity of the of the corresponding transistors 122, 124, 126, 128 as the electrical path 170, 172 passes through the other of the cores 132, 134. As used herein, polarities being aligned refers to the expected direction of current flow being matched, and opposed polarities refers to the expected direction of current flow being opposite.

The electrical paths 170, 172 are configured such that one electrical path 170, 172 matches the polarity of the corresponding electrical path 182, 184, 186, 188, and one electrical path 170, 172 opposes the polarity of the corresponding electrical path 182, 184, 186, 188 in each of the cores 132, 134. During normal operations, this configuration results in a majority of the flux from the cores 132, 134 canceling out and allows the cores 132, 134 to operate in place of the zero voltage switching inductor 130 of the conventional H-bridge 10 (see FIG. 1). Normal operations include repeated transistor 122, 124, 126, 128 switching, and each switch results in a negative voltage spike. In some examples body diodes 180 are sufficiently sized, combined with the uncanceled flux, to clamp the negative voltage spikes due to switching and no additional circuitry is required. In alternative examples, the expected negative voltage spike can exceed the capabilities of the transistor body diodes 180 and a voltage snubber circuit is included. The voltage snubber circuit can be any available voltage snubber circuit capable of handling the expected magnitude of the voltage spikes that occur due to switching, and can be connected to any known snubbing configuration.

When a radiation event, or any other event causing all the transistors 122, 124, 126, 128 to operate in a closed (shoot-through) state, occurs each of the positive nodes is directly connected to the corresponding negative nodes, and all current passes through the cores 132, 134 in the same direction, positive to negative. The aligned polarity of the current flow for the duration of the shoot-through event generates aligned flux in the cores 132, 134 and there is no flux cancellation. As a result, the inductance of the wires 170, 172 that pass through the cores 132, 134 limits the rate at which current is able to increase. The limited current increase allows the transistors, as well as any electrical components connected to the positive and negative terminals to survive through the shoot-through event until the controller or other protection system turns off all transistors 122, 124, 126, 128. After the shoot-through event is finished, a controller or other protection system can reset the transistors 122, 124, 126, 128 allowing the transistors 122, 124, 126, 128 to return to standard operations. In alternative occurrences, where the duration of the shoot-through event is sufficiently short the transistors 122, 124, 126, 128 can immediately return to standard operations and no protection circuit reset is required.

Figure 3:
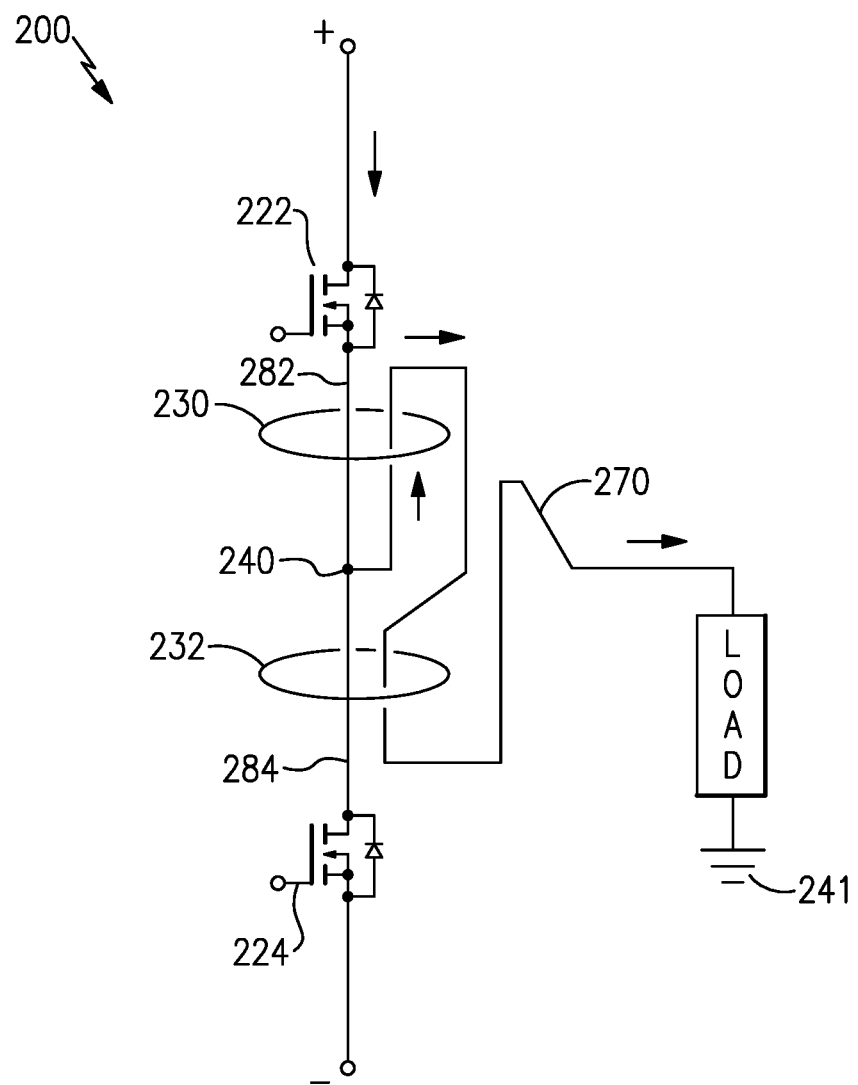
FIG. 3 schematically illustrates an exemplary dual core shoot-through protection half-bridge rectifier topology.

With continued reference to FIGS. 1 and 2, FIG. 3 schematically illustrates application of the dual core shoot-through protection inductor configuration to a half-bridge configuration 200. One of skill in the art will appreciate that the teachings included herein can be extrapolated to three phase bridges and any other similar circuits. The half bridge configuration 200 includes two transistors 222, 224 arranged in series and connected to a center node 240 via a first electrical path 282 and a second electrical path 284. The node 240 is connected to ground via a circuitous electrical path 270 that passes through the cores 230, 232 in opposing directions. As with the H-bridge 100 example, the current flow through the cores 230, 232 negates most, but not all, of the inductance due to flux and the remaining inductance functions to replace the inductor that would connect the node 240 to ground 241 in a conventional half bridge.

While described above with regards to h-bridge topologies and half bridge topologies utilizing transistor switch elements, the dual core shoot-through inductor configuration illustrated and described above with regards to FIGS. 2 and 3 can be extended to any switch arrangement subject to potentially damaging shoot-through events including, but not limited to, motor drivers, other semiconductor switch types, and/or other types of Field Effect Transistors (FETs).

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A shoot-through protection circuit comprising:
    a first transistor switch comprising a first terminal connected to a positive bus, and a second terminal connected to a first center node via a first electrical path;
    a second transistor switch comprising a first terminal connected to a negative bus, and a second terminal connected to the first center node via a second electrical path, wherein the first and second transistor switches are connected in series between the positive bus and the negative bus;
    a circuitous third electrical path connecting the first center node to a first load output, the circuitous third electrical path being a path other than the first and second electrical paths; and
    two magnetic cores, comprising:
        a first magnetic core of the two magnetic cores through which the first electrical path and the circuitous third electrical path pass, the first magnetic core positioned along the first electrical path between the first transistor switch and the first center node; and
        a second magnetic core of the two magnetic cores through which the second electrical path and the circuitous third electrical path pass, the second magnetic core positioned along the second electrical path between the first center node and the second transistor switch and being exclusive of the first magnetic core;
    wherein a polarity of the first electrical path is aligned with a polarity of the circuitous third electrical path within the first magnetic core and a polarity of the second electrical path opposes the polarity of the circuitous third electrical path within the second magnetic core; and
    wherein the circuitous third electrical path limits a rate at which current increases during a duration of a shoot-through event in which both the first transistor switch and second transistor switch are in a closed state.

2. The shoot-through protection circuit of claim 1, further comprising:
    a third transistor switch connected to the positive bus and to a second center node via a fourth electrical path;
    a fourth transistor switch connected to the negative bus and to the second center node via a fifth electrical path;
    a circuitous sixth electrical path connecting the second center node to a second load output;
    the first magnetic core surrounding the fourth electrical path and the circuitous sixth electrical path;
    the second magnetic core surrounding the fifth electrical path and the circuitous sixth electrical path; and
    wherein a polarity of the fifth electrical path is aligned with a polarity of the circuitous sixth electrical path within the second magnetic core and a polarity of the fourth electrical path opposes the polarity of the circuitous sixth electrical path within the first magnetic core.

3. The shoot-through protection circuit of claim 2, wherein the first, second, third and fourth switches are connected as an H-bridge topology.

4. The shoot-through protection circuit of claim 1, wherein the circuit is characterized by a lack of Zero Volt Switching (ZVS) inductors.

5. The shoot-through protection circuit of claim 1, wherein at least one of the first and second switches includes a voltage spike snubber.

6. The shoot-through protection circuit of claim 1, wherein at least one of the first and second switches lacks a voltage spike snubber.

7. The shoot-through protection circuit of claim 1, wherein each of the first transistor switch and the second transistor switch are field effect transistors (FETs).

8. The shoot-through protection circuit of claim 1, wherein the first transistor switch and the second transistor switch are arranged as a half bridge topology.

9. A method for mitigating shoot-through events comprising:
    connecting a terminal of a first switch to a center node via a first electrical path, connecting a terminal of a second switch to the center node via a second electrical path, the first switch comprising another terminal connected to a positive bus and the second switch comprising another terminal connected to a negative bus;
    connecting the center node to a load via a circuitous third electrical path, wherein the first and second switches are connected in series between the positive bus and the negative bus, and the circuitous third electrical path is a path other than the first and second electrical paths;
    passing the first electrical path and the circuitous third electrical path through a first magnetic core of two magnetic cores, the first magnetic core being positioned along the first electrical path between the first switch and the center node;

passing the second electrical path and the circuitous third electrical path through a second magnetic core of two magnetic cores, the second magnetic core being exclusive of the first magnetic core and being positioned along the second electrical path between the center node and the second switch; and using the circuitous third electrical path to limit a rate at which current increases during a duration of a shoot-through event in which both the first and second switches are in a closed state;

wherein the first electrical path is aligned with the circuitous third electrical path within the first magnetic core and the polarity of the second electrical path opposes the circuitous third electrical path within the second magnetic core.

10. The method of claim 9, further comprising:

connecting a third switch to a second center node via a fourth electrical path connecting a fourth switch to the second center node via a fifth electrical path;

connecting the second center node to the load via circuitous sixth electrical path;

passing the fourth electrical path and the circuitous sixth electrical path through the first magnetic core;

passing the fifth electrical path and the circuitous sixth electrical path through the second magnetic core; and wherein the polarity of the fourth electrical path opposes the polarity of the circuitous sixth electrical path within the first magnetic core, and wherein the polarity of the fifth electrical path is aligned with the circuitous sixth electrical path within the second magnetic core.

11. The method of claim 9, wherein the first switch and the second switch are field effect transistors.

12. The method of claim 9, further comprising snubbing zero voltage switching voltage using a body diode of each of the first switch and the second switch.

* * * * *